US012352966B2

(12) United States Patent
Noguchi et al.

(10) Patent No.: US 12,352,966 B2
(45) Date of Patent: Jul. 8, 2025

(54) OPTICAL MODULE AND DISPLAY DEVICE

(71) Applicant: SEIKO EPSON CORPORATION, Tokyo (JP)

(72) Inventors: Toshiyuki Noguchi, Shiojiri (JP); Takashi Takeda, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 676 days.

(21) Appl. No.: 17/536,822

(22) Filed: Nov. 29, 2021

(65) Prior Publication Data

US 2022/0171194 A1 Jun. 2, 2022

(30) Foreign Application Priority Data

Nov. 30, 2020 (JP) .................................. 2020-198141

(51) Int. Cl.
*G02B 27/01* (2006.01)
*G02B 5/00* (2006.01)

(52) U.S. Cl.
CPC ......... *G02B 27/0172* (2013.01); *G02B 5/003* (2013.01); *G02B 2027/013* (2013.01); *G02B 2027/0178* (2013.01)

(58) Field of Classification Search
CPC ..... G02B 27/00–648; G02B 2027/0105–0198; G02B 5/00–32; G03B 21/00–64
See application file for complete search history.

(56) References Cited

U.S. PATENT DOCUMENTS

| 5,703,605 | A | * | 12/1997 | Takahashi | .......... G02B 27/0172 359/630 |
| 2013/0222896 | A1 | * | 8/2013 | Komatsu | ............ G02B 27/0172 359/365 |
| 2016/0052392 | A1 | * | 2/2016 | Terashima | ............. G01D 13/18 359/601 |
| 2017/0307879 | A1 | | 10/2017 | Saiga | |
| 2020/0310132 | A1 | | 10/2020 | Takagi et al. | |
| 2021/0063749 | A1 | | 3/2021 | Takeda et al. | |

FOREIGN PATENT DOCUMENTS

| JP | 2017-198728 A | 11/2017 |
| JP | 2020-160116 A | 10/2020 |
| JP | 2021-033154 A | 3/2021 |

* cited by examiner

*Primary Examiner* — Christopher A Lamb, II
(74) *Attorney, Agent, or Firm* — Oliff PLC (57) ABSTRACT

A display device or optical module includes a display element that emits image light, an imaging optical system as a light guide optical device that has non-axial symmetry in a predetermined direction and forms an exit pupil by light guiding of the image light from the display element, and a light-shielding member disposed between the display element and the imaging optical system, wherein the light-shielding member has a light-shielding part disposed to overlap an unused region in which an image is not displayed in a display region of the display element.

7 Claims, 10 Drawing Sheets

OPTICAL MODULE AND DISPLAY DEVICE

The present application is based on, and claims priority from JP Application Serial Number 2020-198141, filed Nov. 30, 2020, the disclosure of which is hereby incorporated by reference herein in its entirety.

BACKGROUND

1. Technical Field

The present disclosure relates to an optical module and a display device that enable observation of a virtual image, and particularly relates to an optical module including a light guide system having non-axial symmetry.

2. Related Art

As an image display device that performs a distortion correction process on a display image, an image display device in which lower left and right corner regions are also non-display regions to be vertically symmetrical with respect to display regions of upper left and right corner regions which are not displayed by distortion correction in order to reduce a user's sense of incongruity due to loss of symmetry of an observation image by the distortion correction process has been disclosed (JP-A-2017-198728). JP-A-2017-198728 also discloses that, instead of making these the non-display regions, a light-shielding member may block light, and the observation image be not displayed.

In such a display device as disclosed in JP-A-2017-198728, it is conceivable that a phenomenon such as a ghosting or black floating will occur due to surface reflection and leakage light from display pixels in regions in which display is not performed, and deterioration of display quality will occur.

SUMMARY

An optical module in one aspect of the disclosure includes a display element that emits image light, a light guide optical device that has non-axial symmetry in a predetermined direction and forms an exit pupil by light guiding of the image light from the display element, and a light-shielding member disposed between the display element and the light guide optical device, wherein the light-shielding member includes a light-shielding part disposed to overlap an unused region in which an image is not displayed in a display region of the display element.

BRIEF DESCRIPTION OF THE DRAWINGS

FIG. 4 is a perspective view showing a display unit including the display element and the like.

DESCRIPTION OF EXEMPLARY EMBODIMENTS

First Embodiment

Hereinafter, a display device of a first embodiment according to the present disclosure and an optical module incorporated therein will be described with reference to FIGS. 1 to 4 and the like.

Figure 1:
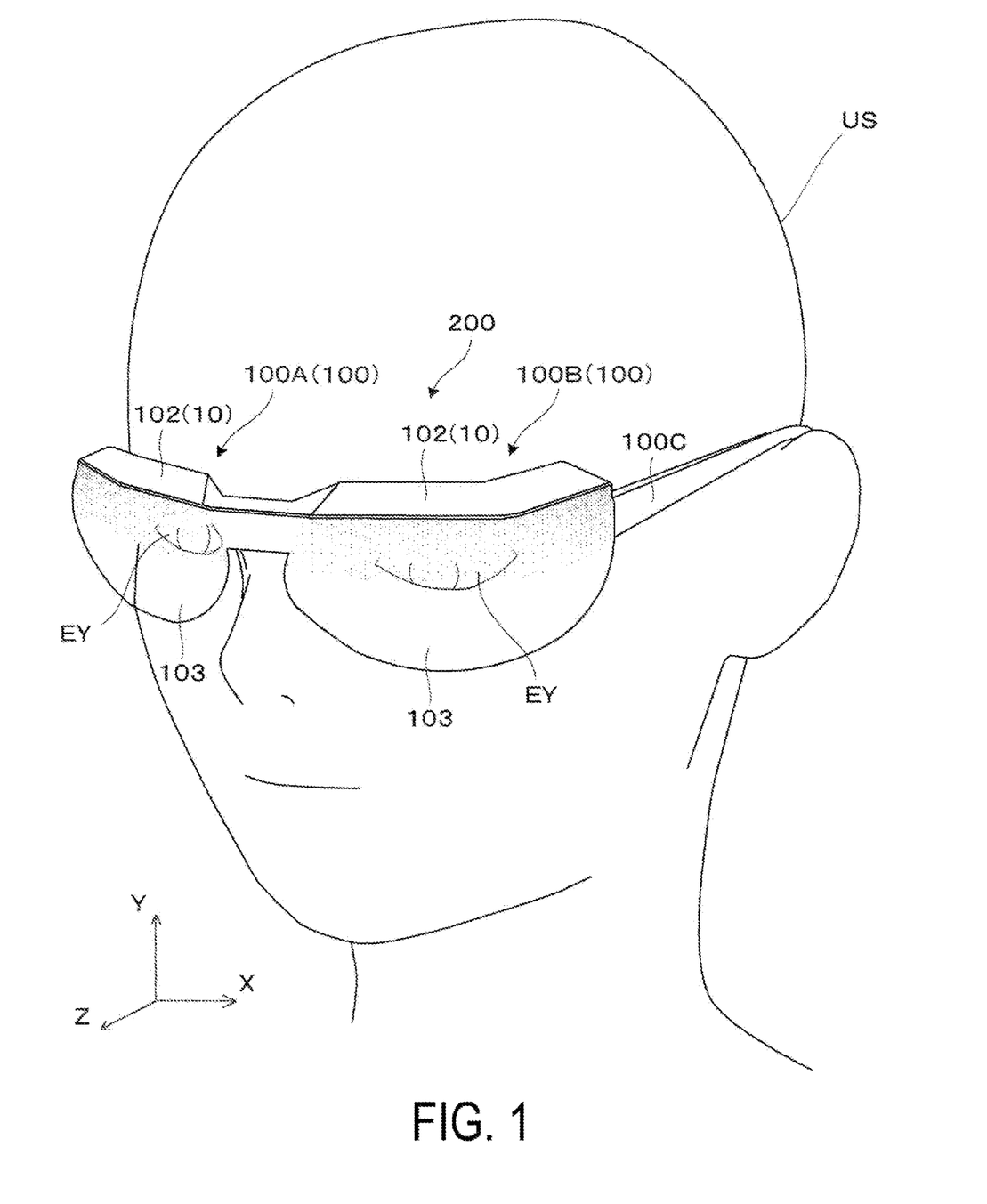
FIG. 1 is an external perspective view showing a mounted state of a display device according to a first embodiment.

FIG. 1 is a diagram showing a mounted state of a head-mounted display (hereinafter, also referred to as "HMD") 200, and the HMD 200 allows an observer or wearer US who is wearing the HMD 200 to be able to recognize an image as a virtual image. In FIG. 1 and the like, X, Y, and Z are an orthogonal coordinate system, a +X direction corresponds to a transverse direction in which the two eyes EY of an observer or wearer US who is wearing the HMD 200 or a display device 100 are disposed, a +Y direction corresponds to an upward direction orthogonal to the transverse direction in which the two eyes EY of the wearer US are disposed, and a +Z direction corresponds to a direction to the front or a forward direction for the wearer US. A ±Y direction is parallel to a vertical axis or a vertical direction.

The HMD 200 includes a first display device 100A for the right eye, a second display device 100B for the left eye, and a pair of temple type support devices 100C that support the display devices 100A and 100B. The first display device 100A includes a display drive part 102 disposed at an upper portion thereof, and an exterior member 103 that has a spectacle lens shape and covers the front of the eye. Similarly, the second display device 100B is constituted of a display drive part 102 disposed at an upper portion thereof, and an exterior member 103 that has a spectacle lens shape and covers the front of the eye. The support device 100C supports the upper end side of the exterior member 103 via the display drive part 102. The first display device 100A and the second display device 100B are optically inverted left and right, and hereinafter, the first display device 100A for the right eye will be described as a representative display device 100.

Figure 2:
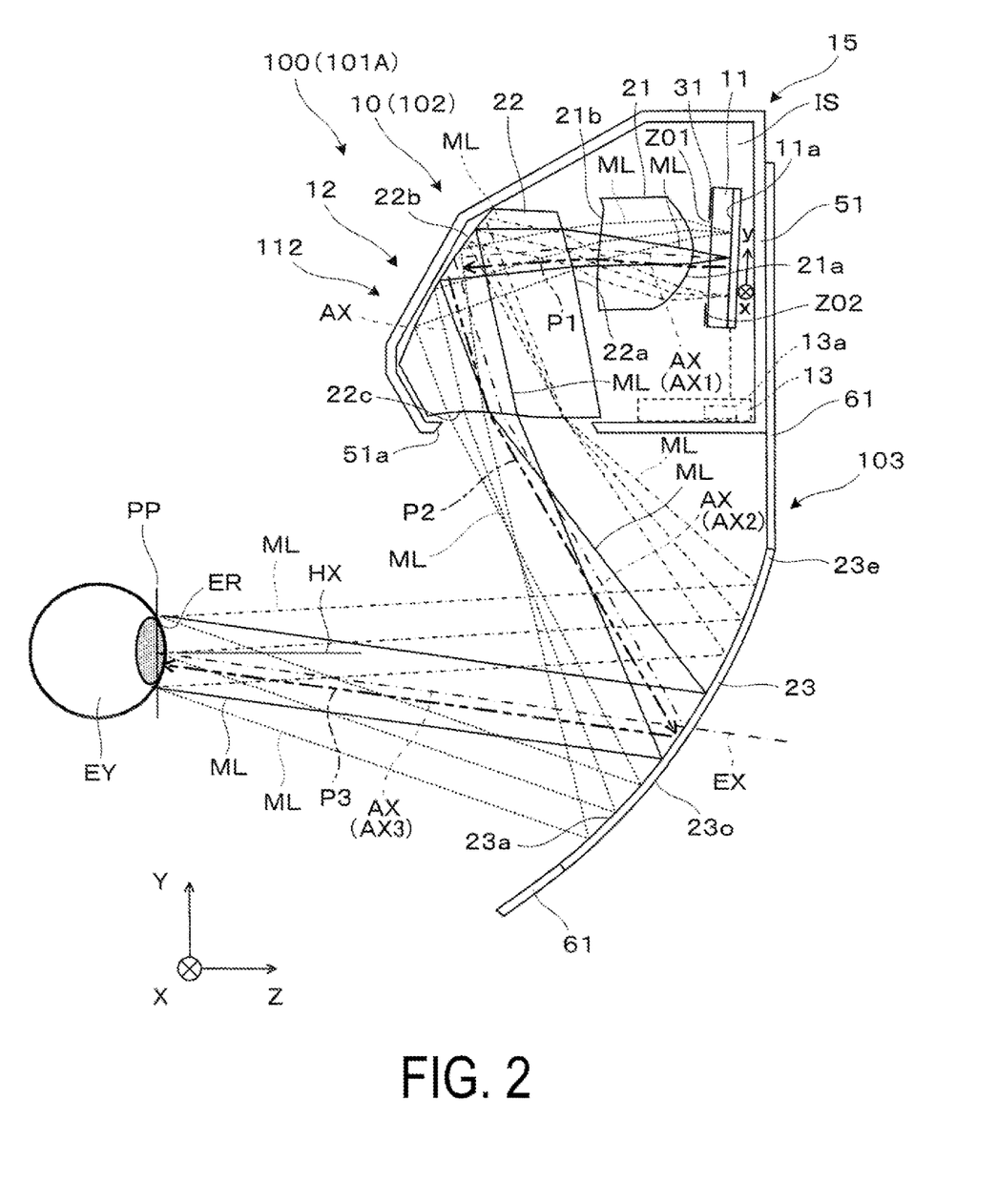
FIG. 2 is a side cross-sectional view showing an internal structure of the display device.

FIG. 2 is a side cross-sectional view showing an optical structure of the display device 100. The display device 100 includes an display element 11, an imaging optical system 12, and a control device 13. The imaging optical system 12 is also referred to as a light guide optical device. A combination of the display element 11 and the imaging optical system 12, that is, the display device 100 excluding the control device 13 is referred to as an optical module 15. In the optical module 15, a light-shielding member 31 that prevents stray light is disposed in the vicinity of the display element 11 between the display element 11 and the imaging optical system 12. The display element 11, the light-shielding member 31, and the control device 13 are supported in a case 51 that is an outer frame of the display drive part 102 shown in FIG. 1, and a part of the imaging optical system 12 is also supported in the case 51 of the display drive part 102.

The display element 11 is a spontaneous light emission type display device. The display element 11 is, for example, an organic electroluminescence (EL) display, and forms a color still image or moving image on a two-dimensional display surface 11a. The display element 11 is disposed along an x-y plane that is inclined by being slightly rotated about the X axis with respect to an X-Y plane. The display element 11 is driven by the control device 13 to perform a display operation.

Figure 3:
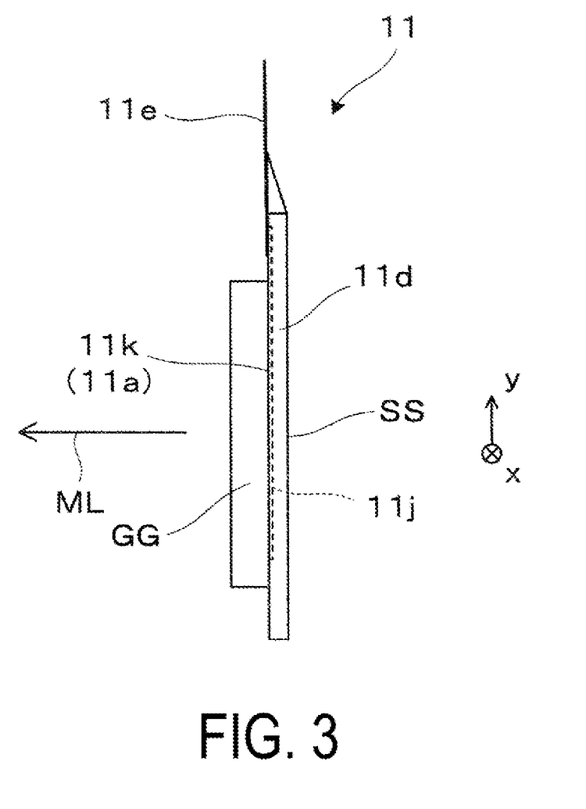
FIG. 3 is a cross-sectional view showing a specific structure of a display element.

FIG. 3 is a cross-sectional view showing a specific structure of the display element 11. The shown display element 11 has a plate-shaped main body portion 11d and a flexible printed circuit (FPC) portion 11e that is connected to the main body portion 11d and extends upward. In these portions, the main body portion 11d includes a silicon substrate SS in which a drive circuit 11j is formed and forming an exterior of the main body portion 11d, a light emission layer 11k which is an organic EL element containing an organic EL material and generates light of a color needed for image light, and a protective glass GG for sealing that seals the light emission layer 11k in cooperation with the silicon substrate SS. The display element 11 emits an image light ML toward the protective glass GG side by performing a light emission operation in accordance with a drive signal received from the FPC portion 11e.

The display element 11 is not limited to the organic EL display, and can be replaced with a display device using inorganic EL, an organic LED, an LED array, a laser array, a quantum dot light emission element, or the like. The display element 11 is not limited to a spontaneous light emission type image light generation device, and may include an LCD and another light modulation element, and may form an image by illuminating the light modulation element with a light source such as a backlight. As the display element 11, a liquid crystal on silicon (LCOS) (LCoS is a registered trademark), a digital micro-mirror device, or the like may be used instead of an LCD.

Figure 4:
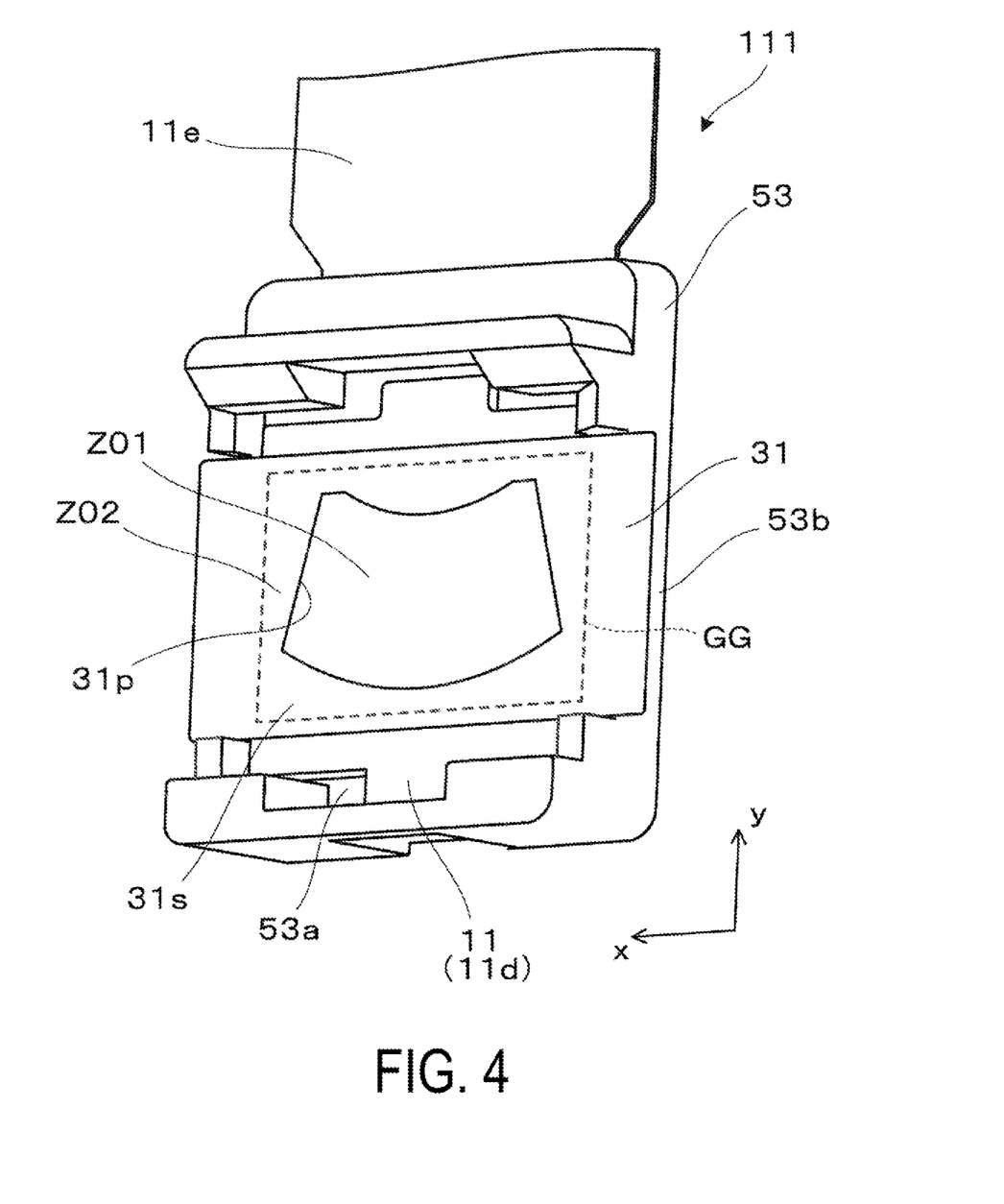
Figure 5A:
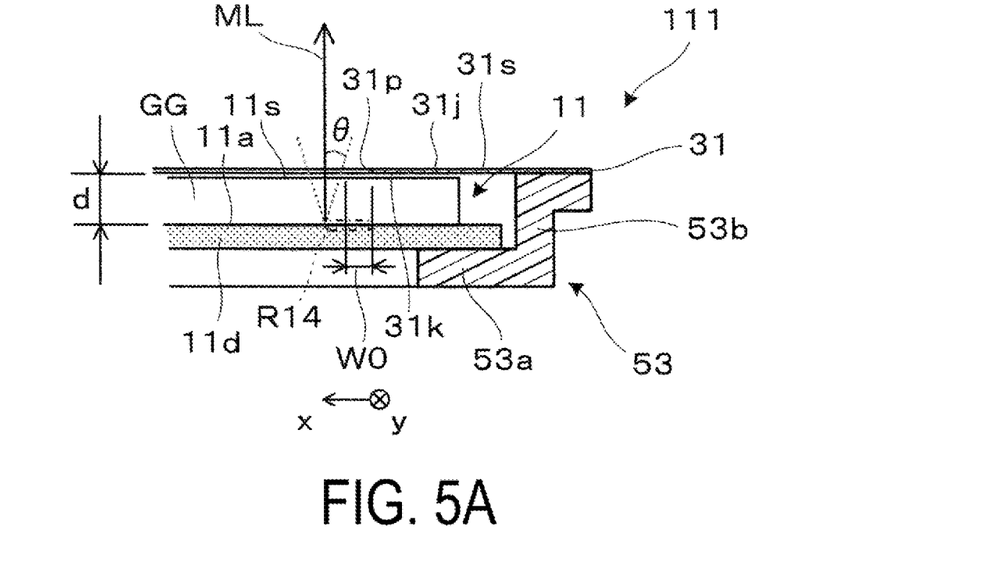
FIG. 5A is a partially enlarged cross-sectional view showing a structure of the display unit.

FIG. 4 is a perspective view showing a display unit including the display element 11 and the like shown in FIG. 3 and the like, and FIG. 5A is a partially enlarged cross-sectional view showing a structure of the display unit shown in FIG. 4. In a display unit 111 shown, the display element 11 and the light-shielding member 31 are fixed to a support member 53 and are aligned with each other. A combination of the display element 11, the light-shielding member 31, and the support member 53 is referred to as the display unit 111. The support member 53 is a member having a rectangular outline formed of a resin, and has a bottom 53a and a frame portion 53b. The rectangular plate-shaped display element 11 is fixed to the bottom 53a using an adhesive material or a cohesive material, and the rectangular thin plate-shaped light-shielding member 31 is fixed to the frame portion 53b using an adhesive material or a cohesive material. The light-shielding member 31 is a light-shielding aperture having an annular fan-shaped opening 31p, and is formed from a metal, a resin, or the like having light-shielding properties with light absorption. The light-shielding member 31 has an annular fan-shaped transmission region Z01 and a light-shielding region Z02 that surrounds the transmission region Z01. In other words, the light-shielding member 31 has the opening 31p in the transmission region Z01. The support member 53 can be fixed while being aligned with a projection lens 21 and the like constituting the imaging optical system 12 in the case 51.

The light-shielding member 31 has a front surface 31j and a back surface 31k coated with a black paint to provide light absorption properties to the light-shielding region Z02. In other words, in the light-shielding region Z02 of the light-shielding member 31, visible light incident on the front surface 31j and the back surface 31k is absorbed, and generation of the stray light is curbed. The front surface 31j and the back surface 31k may be subjected to surface processing to enhance the light absorption properties. The effective image light ML emitted from the display element 11 passes through the opening 31p without being blocked by the light-shielding member 31.

Figure 6:
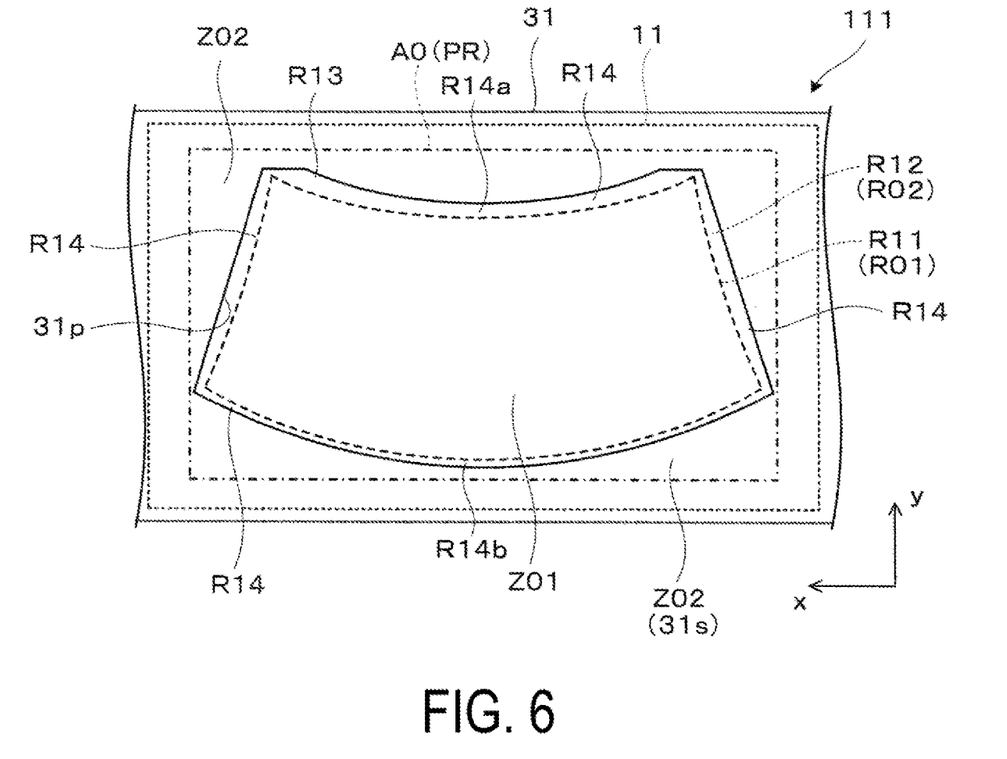
FIG. 6 is a front view of the display unit.

FIG. 6 is a partial front view of the display unit 111 shown in FIG. 4. The display element 11 has a display region A0 corresponding to the display surface 11a shown in FIG. 2 or the light emission layer 11k shown in FIG. 3. The display element 11 may display an image in the display region A0, but does not utilize the entire region. The display region A0 corresponds to a pixel formation region PR, and the pixel formation region PR includes a first region R11 corresponding to a used region R01 that displays a distortion-corrected image corresponding to distortion of the imaging optical system 12, and a second region R12 corresponding to an unused region R02 that is set in a region other than the first region R11 and does not display an image. On the other hand, the light-shielding member 31 locally covers a region of the display region A0 that is not utilized, rather than entirely exposing the display region A0 or the pixel formation region PR of the display element 11. Specifically, the light-shielding member 31 includes the transmission region Z01 that transmits the image light ML emitted from at least the first region R11 of the display element 11, and the light-shielding region Z02 that overlaps the second region R12 of the display element 11 when seen in a normal direction of the display surface 11a of the display element 11. The light-shielding region Z02 of the light-shielding member 31 corresponds to a light-shielding part 31s disposed to overlap the unused region R02 in which an image is not displayed in the display region A0 of the display element 11.

A contour shape of the transmission region Z01 provided in the light-shielding member 31 is an annular fan shape, and substantially coincides with a contour shape of the first region R11 provided in the display element 11. Unnecessary light from the second region R12 can be reliably shielded by causing the contour shape of the transmission region Z01 to coincide with the contour shape of the first region R11. As a result, light incident on the unused region R02 of the display element 11 can be prevented from being reflected by an element surface 11s (refer to FIG. 5A) and being ghost light. In other words, the generation of stray light can be curbed by the light-shielding member 31, and display quality can be improved. The contour shape of the transmission region Z01 is such that the distortion of the imaging optical system 12 is canceled out, and may not have an annular fan shape as shown.

More specifically, the transmission region Z01 provided in the light-shielding member 31 is formed to face a region R13 in which the first region R11 expands outward along the display surface 11a of the display element 11. That is, the transmission region Z01 expands to the unused region R02 that is present around the used region R01 or the first region R11, and faces the used region R01 and a margin region R14 therearound. The margin region R14 is a frame-shaped region that extends in a band shape, and is set to a width of, for example, several pixels to several tens of pixels. In this case, the transmission region Z01 is slightly larger than the first region R11, and fine adjustment in which the first region R11 is shifted by a distance of a predetermined number of pixels corresponding to the width of the margin region R14 is possible. Here, the margin region R14 or the predetermined number of pixels thereof serves as an adjustment margin in changing a distortion correction shape when a way of the distortion of the imaging optical system 12 changes due to variations in components and assembly. The margin region R14 also allows shifting of a display position when an imaging position is adjusted by the imaging optical system 12. In the case of the shown margin region R14, although the width thereof is different on the top, bottom, left and right, the width of the margin region R14 may be equal on the top, bottom, left, and left sides, that is, it may be equal around the used region R01 or the first region R11.

When the light-shielding member 31 and the display surface 11a of the display element 11 are separated as shown in FIG. 5A, it is desirable to widen the margin region R14 in accordance with an increase in a distance d between the light-shielding member 31 and the display surface 11a in consideration of an opening angle θ of the image light ML emitted from the display surface 11a. An amount of expansion with respect to a target amount W0 is generally dx sin θ. A thickness of the protective glass GG is typically approximately 1 mm to 2 mm, and the amount of expansion of the margin region R14 in consideration of a distance to the light-shielding member 31 is also approximately 2 mm or less.

Figure 5B:
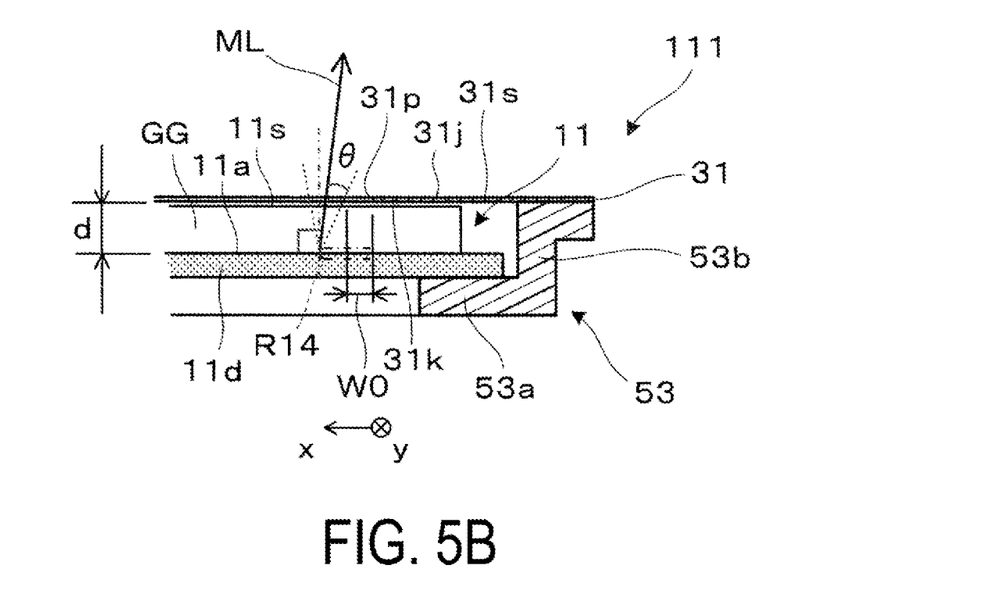
FIG. 5B is a diagram showing a case in which main rays are inclined.

As shown in FIG. 5B, in a case in which the main rays of the image light ML emitted from the display surface 11a of the display element 11 are inclined with respect to a normal line of the display surface 11a, the amount of expansion of the margin region R14 is adjusted in consideration of this inclination angle δ. When the inclination angle of the main rays is defined as δ (positive on the outer side), the amount of expansion is generally dx sin(θ+δ), and when the inclination angle δ is outward, it is necessary to increase the amount of expansion by an amount corresponding to the inclination angle δ. When considering the inclination angle of the main rays, as shown in FIG. 6, a width of a lower region R14b of the margin region R14 is narrower than a width of an upper region R14a thereof.

Figure 5C:
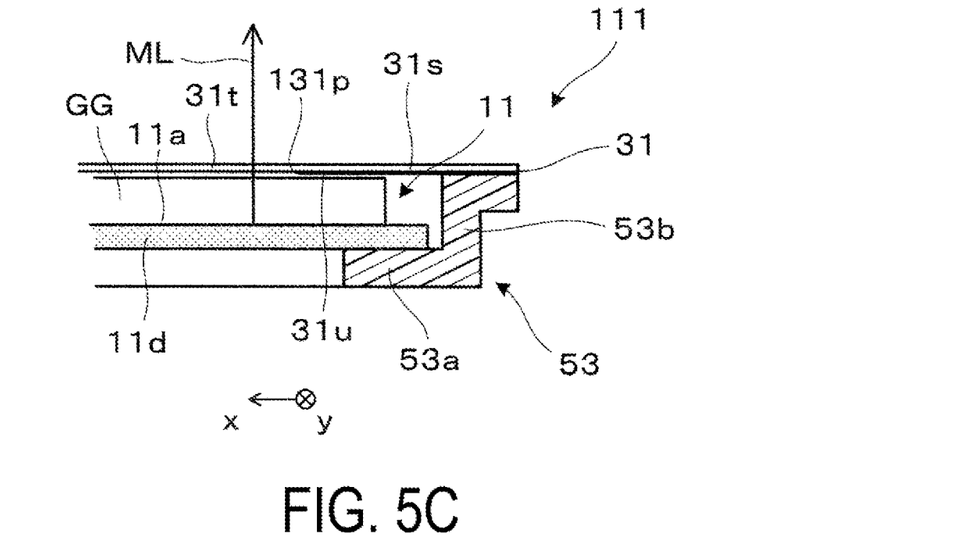
FIG. 5C is a partially enlarged cross-sectional view showing a modified example of the display unit.

FIG. 5C is a partially enlarged cross-sectional view showing a light-shielding member 31 according to a modified example. In this case, the light-shielding member 31 is formed of a plate-shaped member 31t having light transmission properties, and a portion of a lower surface of the plate-shaped member 31t in which a light absorbing layer 31u is provided in a range corresponding to the light-shielding region Z02 serves as a light-shielding part 31s, and an inner edge of the light absorbing layer 31u serves as an optical opening 131p. The image light ML incident in the optical opening 131p passes through the plate-shaped member 31t without being blocked by the light-shielding member 31.

Figure 5D:
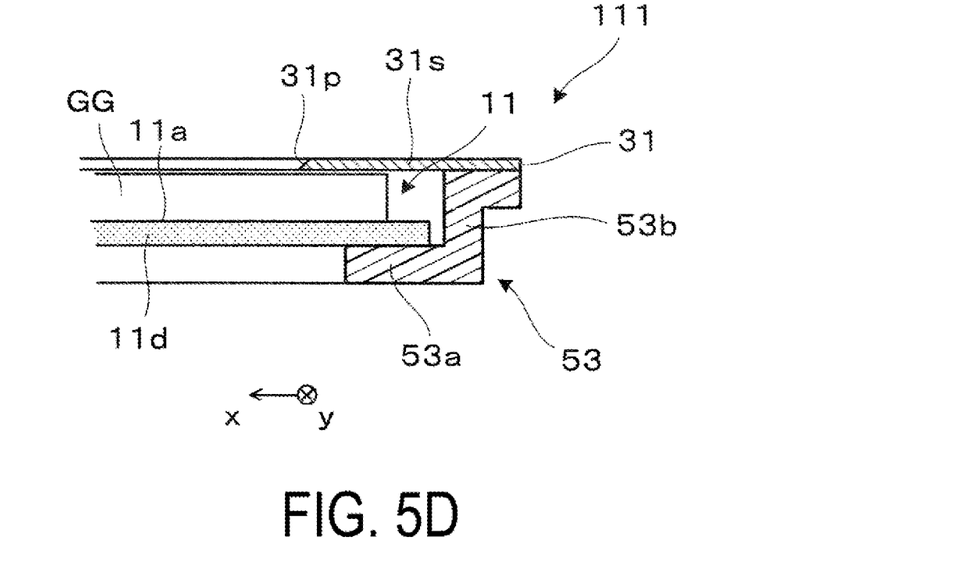
FIG. 5D is a partially enlarged cross-sectional view showing another modified example of the display unit.

FIG. 5D is a partially enlarged cross-sectional view showing a light-shielding member 31 according to another modified example. In this case, the light-shielding member 31 is formed of a material having light-shielding properties, has an annular fan-shaped opening 31p, and is thicker than that shown in FIG. 5A. Thus, a tapered surface that expands in a direction away from the display element 11 is formed in the opening 31p.

Figure 5E:
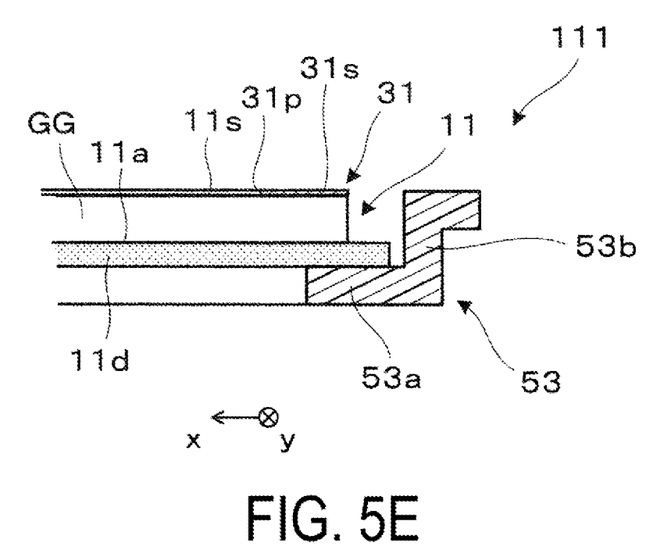
FIG. 5E is a partially enlarged cross-sectional view showing yet another modified example of the display unit.

FIG. 5E is a partially enlarged cross-sectional view showing a light-shielding member 31 according to yet another modified example. In this case, the light-shielding member 31 is directly fixed to the display element 11 rather than to the support member 53. The light-shielding member 31 is attached to the element surface 11s of the display element 11 using an adhesive material or a cohesive material.

Figure 5F:
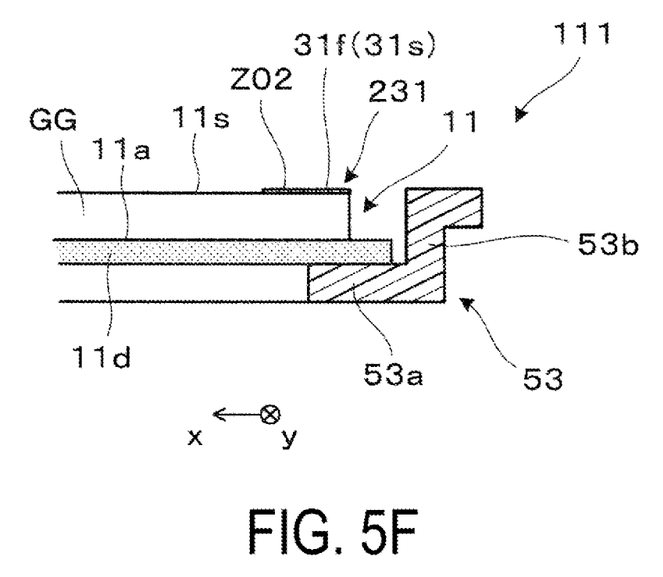
FIG. 5F is a partially enlarged cross-sectional view showing still another modified example of the display unit.

FIG. 5F is a partially enlarged cross-sectional view showing a light-shielding member 231 according to still another modified example. In this case, the light-shielding member 231 is formed by processing the element surface 11s of the display element 11, and is formed by applying or depositing a light-shielding film 31f having light absorbing properties on a region of the element surface 11s, which is a surface of the protective glass GG having light transmission properties, corresponding to the light-shielding region Z02. The light-shielding film 31f serves as a light absorbing layer. The light-shielding film 31f may be a sheet that is attached to the element surface 11s of the display element 11.

Although not shown, the light-shielding member 31 may be detachably fixed to the support member 53 or the display element 11. At this time, an engagement mechanism and an alignment mechanism may be incorporated.

Returning to FIG. 2, the control device 13 is a display control circuit, and controls a display operation of the display element 11 by outputting a drive signal corresponding to an image to the display element 11. The control device 13 includes, for example, an IF circuit, a signal processing circuit, and the like, and causes a two-dimensional image display to be performed on the display element 11 according to image data or an image signal received from the outside. The control device 13 may include a main substrate that controls a first display device 100A and a second display device 100B. The main substrate may have, for example, an interface function that communicates with an external device (not shown) and performs signal conversion on a signal received from the external device, and an integrated function that links between the display operation of the first display device 100A and the display operation of the second display device 100B.

An image processing circuit 13a is incorporated into the control device 13, and causes the display surface 11a of the display element 11 to perform a distortion-corrected display. As described below, the imaging optical system 12 is an off-axis optical system 112 having distortion aberration, that is, distortion. To compensate for this distortion, a distortion-corrected image with a non-rectangular outline is formed in the used region R01 of the display surface 11a, as described in FIG. 6. The image processing circuit 13a performs image processing in which an image with a rectangular outline corresponding to an input signal from the outside is distortion-corrected into an image with a non-rectangular outline to be displayed on the display surface 11a.

The imaging optical system 12 includes a projection lens 21, a prism mirror 22, and a see-through mirror 23 as an optical unit 10. In the present embodiment, an optical path from the display element 11 to the prism mirror 22 is disposed above an upper end 23e of the see-through mirror 23. More specifically, the display element 11, the projection lens 21, and the prism mirror 22 are disposed above the upper end 23e of the see-through mirror 23. However, the projection lens 21, the prism mirror 22, and the like may be disposed at positions which are partially lower than the upper end 23e of the see-through mirror 23 in the range in which an optical path of an image light ML incident on the eye EY is not obstructed. That is, the projection lens 21, the prism mirror 22, and the like may be disposed at positions which are partially lower than the upper end 23e of the see-through mirror 23 in the range in which the optical path of the image light ML incident on the eye EY is not obstructed.

The projection lens 21 causes the image light ML emitted from the display element 11 to pass therethrough and then to be incident on the prism mirror 22. The projection lens 21 focuses the image light ML emitted from the display element 11 into a state close to a parallel luminous flux. The projection lens 21 is a single lens, and has an incident surface 21a and an emission surface 21b. The prism mirror 22 has a light incident surface 22a, an inner reflection surface 22b, and a light emission surface 22c, and causes the image light ML emitted from the projection lens 21 to be incident on the light incident surface 22a, to be totally reflected by the inner reflection surface 22b, and to be emitted from the light emission surface 22c. At this time, the prism mirror 22 emits the image light ML incident from the front such that it is bent in a direction inclined with respect to a direction in which an incident direction is reversed (a direction of the light source seen from the prism mirror 22). In the case of an optical system that is eccentric in a longitudinal direction as in the present embodiment, in front of the optical path includes that within a range of about 45° up and down with respect to the +Z direction, and a direction inclined with respect to the front (that is, the direction in which the incident direction is reversed) includes that within a range of about 45° up and down with respect to an intermediate direction formed at 45° with respect to the +Z direction and the −Y direction. The see-through mirror 23 reflects the image light ML emitted from the prism mirror 22 toward a pupil position PP. The pupil position PP is a position at which the image light ML from each of points on the display surface 11a is incident to overlap from an angular direction corresponding to a position of each of points on the display surface 11a in a predetermined divergent state or a parallel state. A field of view (FOV) of the display device 100 including the imaging optical system 12 shown is 44°, for example. A display region of the virtual image by the display device 100 is rectangular, and the 44° is a diagonal direction.

The imaging optical system 12 is an off-axis optical system 112 due to the see-through mirror 23 being a concave mirror. In the case of the present embodiment, the projection lens 21, the prism mirror 22, and the see-through mirror 23 are disposed to be non-axially symmetrical and have an optical surface that is non-axisymmetric. The fact that the imaging optical system 12 is an off-axis optical system 112 means that the overall optical path is bent with respect to before and after light rays are incident on a plurality of reflection surfaces or refraction surfaces in the optical elements 21, 22, and 23 constituting the imaging optical system 12. In this imaging optical system 12, that is, the off-axis optical system 112, an optical axis AX is bent so that the optical axis AX extends along an off-axis surface (a surface parallel to a Y-Z plane) corresponding to a plane of the drawing. In this imaging optical system 12, the optical elements 21, 22, and 23 are arranged along the off-axis surface by bending the optical axis AX in the off-axis surface parallel to the Y-Z plane. The imaging optical system 12 includes optical axis portions AX1, AX2, and AX3 that are disposed along the off-axis surface (a surface parallel to the Y-Z plane) which is a reference surface extending in the longitudinal direction and are inclined with respect to each other before and after the reflection surface. The optical axis AX as a whole extends along an optical path of the main rays emitted from the center of the display element 11 and passes through the center of the eye ring ER or the pupil corresponding to an eye point. The optical axis AX is disposed in a Z shape by the plurality of optical axis portions AX1, AX2, and AX3 when seen in a transverse cross section parallel to the Y-Z plane. In other words, in the off-axis surface parallel to the Y-Z plane, an optical path P1 from the projection lens 21 to an inner reflection surface 22b, an optical path P2 from the inner reflection surface 22b to the see-through mirror 23, and an optical path P3 from the see-through mirror 23 to the pupil position PP are bent in a Z shape in two stages. The imaging optical system 12 is arranged vertically. The off-axis surface (the surface parallel to the Y-Z plane) which is a reference surface extends parallel to the Y direction which is a longitudinal direction. In this case, the optical elements 21, 22, and 23 constituting the display device 100 are arranged so that height positions thereof are changed in the longitudinal direction, and an increase in a transverse width of the display device 100 can be prevented while a high angle of view is achieved. Furthermore, it is also possible to have a compact and lightweight constitution in the longitudinal direction.

In the imaging optical system 12, the optical path P1 from the projection lens 21 to the inner reflection surface 22b is in a state nearly parallel to the Z direction. That is, in the optical path P1, the optical axis portion AX1 extends substantially parallel to the Z direction or a forward direction. As a result, the projection lens 21 is disposed between the prism mirror 22 and the display element 11 in the Z direction or the forward direction. The optical axis portion AX1 in the optical path P1 is preferably kept within a range of approximately −30° to +30° in the Z direction with a downward direction being negative. It is possible to avoid interference of the projection lens 21 and the display element 11 with the see-through mirror 23 by setting the optical axis portion AX1 of the optical path P1 to be −30° or more downward in the Z direction. In addition, it is possible to prevent the projection lens 21 and the display element 11 from protruding upward and becoming visually noticeable by setting the optical axis portion AX1 of the optical path P1 to be +30° or less upward in the Z direction. In the optical path P2 from the inner reflection surface 22b to the see-through mirror 23, the optical axis portion AX2 is preferably kept within a range of an approximately −70° to −45° on average in the Z direction with the downward direction being negative. It is possible to avoid an excessive increase in the overall inclination of the see-through mirror 23 and to easily secure a space in which an inner lens is disposed inside the see-through mirror 23 by setting the optical axis portion AX2 of the optical path P2 to be −70° or more downward in the Z direction. In addition, it is possible to avoid arrangement of the prism mirror 22 such that it protrudes greatly in the −Z direction or a backward direction with respect to the see-through mirror 23 and to avoid an increase in a thickness of the imaging optical system 12 by setting the optical axis AX of the optical path P2 to be −45° or less downward in the Z direction. The optical path P3 from the see-through mirror 23 to the pupil position PP is in a state of being nearly parallel to the Z direction, but in the shown example, the optical axis portion AX3 is approximately −10° in the Z direction with the downward direction being negative. That is, an emission optical axis EX which is an extension of the optical axis portion AX3 is inclined downward by approximately 10° with respect to the +Z direction on the front side and extends. This is because a line of sight of a human being is stable in a slightly lowered eye state in which the line of sight is inclined downward by approximately 10° with respect to a horizontal direction. A central axis HX that extends in the horizontal direction with respect to the pupil position PP assumes a case in which the wearer US wearing the display device 100 relaxes in an upright posture and faces the front and gazes at the horizontal direction or the horizontal line. Although a shape and posture of the head including the arrangement of the eyes and the arrangement of the ears, and the like of the individual wearer US wearing the display device 100 are various, the average central axis HX can be set for the display device 100 of interest by assuming the average head shape or head position of the wearer US. As a result of the above, in the inner reflection surface 22b of the prism mirror 22, a reflection angle of the light rays along the optical axis AX is approximately 10° to 60°. Further, in the see-through mirror 23, the reflection angle of the light rays along the optical axis AX is approximately 20° to 45°.

The projection lens 21 and the prism mirror 22 are accommodated in the case 51 together with the display element 11. The case 51 is formed of a light-shielding material and supports the control device 13 that operates the display element 11. The case 51 is formed of a metal material or a resin material. In the case of a resin material, a black light-shielding material may be applied to the inner surface side thereof. The case 51 supports the display unit 111, the projection lens 21, and the prism mirror 22 via a holding member or a lens barrel (not shown) formed of a light-shielding material. The case 51 has an opening 51a and allows the display drive part 102 to emit the image light ML toward the outside. The image light ML emitted outside the display drive part 102 is incident on the inside of the see-through mirror 23.

The case 51 supports the see-through mirror 23 via a support plate 61. In this case, the see-through mirror 23 is stably supported with respect to the prism mirror 22 or the like via the case 51. The see-through mirror 23 and the support plate 61 correspond to the exterior member 103 shown in FIG. 1.

The details of the imaging optical system 12 which is a light guide optical device will be described with reference to FIG. 7. In FIG. 3, a region AR1 shows a side cross-sectional view of the imaging optical system 12, and a region AR2 is a conceptual diagram for showing a structure of the imaging optical system 12 in a plan view.

The incident surface 21a and the emission surface 21b which are the optical surfaces constituting the projection lens 21 have asymmetry with respect to longitudinal first directions D11 and D12 parallel to the Y-Z plane and intersecting the optical axis AX with the optical axis AX interposed therebetween, and have symmetry with respect to a transverse second direction D02 or the X direction orthogonal to the first directions D11 and D12 with the optical axis AX interposed therebetween. The longitudinal first direction D11 with respect to the incident surface 21a and the longitudinal second direction D12 with respect to the emission surface 21b form a predetermined angle.

The projection lens 21 may be formed of, for example, a resin, but may also be formed of glass. The incident surface 21a and the emission surface 21b of the projection lens 21 are freely-curved surfaces, for example. The incident surface 21a and the emission surface 21b are not limited to freely-curved surfaces, and may be aspherical surfaces. In the projection lens 21, an aberration reduction can be achieved by setting the incident surface 21a and the emission surface 21b to be freely-curved surfaces or aspherical surfaces, and, particularly when a freely-curved surface is used, and because the optical performance of an eccentric system is easily improved, an aberration of the imaging optical system 12 which is a non-coaxial off-axis optical system 112 can be easily reduced. The freely-curved surface is a surface without an axis of rotational symmetry, and various polynomials may be used as a surface function of the freely-curved surface. In addition, the aspherical surface is a surface having an axis of rotational symmetry and represented by a polynomial, but is a paraboloid or a surface other than a spherical surface. Although detailed illustration is omitted, an antireflection film is formed on the incident surface 21a and the emission surface 21b.

The prism mirror 22 is a refractive reflection optical member having a function of combining a mirror and a lens, and reflects the image light ML from the projection lens 21 while refracting it. More specifically, in the prism mirror 22, the image light ML is incident on the inside via the light incident surface 22a which is the refraction surface, is totally reflected in a non-forward direction by the inner reflection surface 22b which is the reflection surface, and is emitted to the outside via the light emission surface 22c which is the refraction surface. The light incident surface 22a and the light emission surface 22c are optical surfaces formed of curved surfaces, and contribute to resolution improvement compared to a case in which they are only the reflection surfaces or they are flat surfaces. The light incident surface 22a, the inner reflection surface 22b, and the light emission surface 22c which are the optical surfaces constituting the prism mirror 22 have asymmetry with respect to the longitudinal first directions D21, D22, and D23 parallel to the Y-Z plane and intersecting the optical axis AX with the optical axis AX interposed therebetween, and have symmetry with respect to the transverse second direction D02 or the X direction orthogonal to the first directions D21, D22, and D23 with the optical axis AX interposed therebetween.

The prism mirror 22 may be formed of, for example, a resin, but may also be formed of glass. A refractive index of a main body of the prism mirror 22 is set to a value such that total reflection on the inner surface is achieved in consideration of a reflection angle of the image light ML. A refractive index and an Abbe number of the main body of the prism mirror 22 are preferably set in consideration of a relationship with the projection lens 21. In particular, color dispersion remaining as a whole is reduced by increasing the Abbe number of the prism mirror 22 and the projection lens 21.

The optical surface of the prism mirror 22, that is, the light incident surface 22a, the inner reflection surface 22b, and the light emission surface 22c are, for example, freely-curved surfaces. The light incident surface 22a, the inner reflection surface 22b, and the light emission surface 22c are not limited to freely-curved surfaces, and may be aspherical surfaces. In the prism mirror 22, the aberration reduction can be achieved by setting the optical surfaces 22a, 22b, and 22c to be freely-curved surfaces or aspherical surfaces, and, in particular, when a freely-curved surface is used, the optical performance of the eccentric system is easily improved. That is, the aberration of the imaging optical system 12 which is the non-coaxial off-axis optical system 112 is easily reduced, and the resolution can be improved. The inner reflection surface 22b is not limited to one that reflects the image light ML by total reflection, and may be a reflection surface formed of a metal film or a dielectric multilayer film. In this case, a reflection film formed of a single layer film or multilayer film formed of a metal such as Al or Ag is formed on the inner reflection surface 22b by vapor deposition or the like, or a sheet-shaped reflection film formed of a metal is affixed thereto. Although detailed illustration is omitted, an antireflection film is formed on the light incident surface 22a and the light emission surface 22c.

The see-through mirror 23 is a curved plate-shaped optical member that serves as a concave surface mirror, and reflects the image light ML from the prism mirror 22. That is, the see-through mirror 23 reflects the image light ML from an emission region of the display drive part 102 toward the pupil position PP. The see-through mirror 23 covers the pupil position PP at which the eye EY or the pupil is disposed, has a concave shape toward the pupil position PP, and has a convex shape toward the outside. The see-through mirror 23 is a concave transmission mirror that covers the entire effective region of a screen in the view. The see-through mirror 23 is a collimator having a convergence function, and converges the main rays of the image light ML temporarily spread by imaging in the vicinity of the emission region of the display drive part 102, which are the main rays of the image light ML emitted from each of points on the display surface 11a, at the pupil position PP. The see-through mirror 23 is a mirror plate having a structure in which a mirror film 23c is formed on a front surface or a back surface of a plate-shaped body 23b. The reflection surface 23a of the see-through mirror 23 has transmissive properties. The see-through mirror 23 and the reflection surface 23a have asymmetry with respect to the longitudinal first direction D31 parallel to the Y-Z plane and intersecting the optical axis AX with the optical axis AX interposed therebetween, and have symmetry with respect to the transverse second direction D02 or the X direction orthogonal to the first direction D31 with the optical axis AX interposed therebetween.

The reflection surface 23a of the see-through mirror 23 is, for example, a freely-curved surface. The reflection surface 23a is not limited to a freely-curved surface, and may be an aspherical surface. The aberration reduction can be achieved by setting the see-through mirror 23 to be a freely-curved surface or an aspherical surface, and, in particular, when a freely-curved surface is used, the aberration of the imaging optical system 12 which is an off-axis optical system or a non-coaxial optical system can be easily reduced. The see-through mirror 23 has a shape in which the origin of a curved surface expression is shifted toward the projection lens 21 side or the display element 11 side from an effective region of the see-through mirror 23, even when the reflection surface 23a is any one of a freely-curved surface and an aspherical surface. In this case, an inclined surface of the see-through mirror 23 that realizes a Z shaped optical path without imposing an excessive burden on the design of the optical system can be set.

The see-through mirror 23 is a transmissive type reflection element that allows transmission of some of light upon reflection, and the mirror film 23c of the see-through mirror 23 is formed by a reflection layer having a semi-transmissive property. Thus, because outside light OL passes through the see-through mirror 23, see-through view of the outside is enabled, and a virtual image can be superimposed on an outside image. At this time, when the plate-shaped body 23b has a thickness of less than or equal to approximately a few millimeters, a change in magnification of the outside image can be curbed to be small. A reflectance of the mirror film 23c with respect to the image light ML and the outside light OL is set to 10% or more and 50% or less in a range of an incident angle of the assumed image light ML from the viewpoint of ensuring a brightness of the image light ML and facilitating observation of the outside image by see-through. The plate-shaped body 23b which is a base material of the see-through mirror 23 is formed of, for example, a resin, and may also be formed of glass. The plate-shaped body 23b is formed of the same material as the support plate 61 that supports the plate-shaped body 23b from the surrounding thereof, and has the same thickness as the support plate 61. The mirror film 23c is formed of, for example, a dielectric multilayer film configured of a plurality of dielectric layers having an adjusted film thickness. The mirror film 23c may be a single-layer film or a multilayer film of a metal such as Al or Ag of which a film thickness has been adjusted. The mirror film 23c may be formed by laminating using deposition, for example, and may also be formed by affixing a sheet-shaped reflection film. An antireflection film is formed on an outer surface 23o of the plate-shaped body 23b.

In describing the optical path, the image light ML from the display element 11 is emitted in a state in which it is incident on the projection lens 21 and is substantially collimated. The image light ML that has passed through the projection lens 21 is incident on the prism mirror 22, passes through the light incident surface 22a while being refracted by it, is reflected by the inner reflection surface 22b with a high reflectance close to 100%, and is refracted again by the light emission surface 22c. The image light ML from the prism mirror 22 is incident on the see-through mirror 23 and is reflected by the reflection surface 23a with a reflectance of about 50% or less. The image light ML reflected by the see-through mirror 23 is incident on the pupil position PP at which the eye EY or pupil of the wearer US is placed. The outside light OL that has passed through the see-through mirror 23 and the support plate 61 therearound is also incident on the pupil position PP. In other words, the wearer US wearing the display device 100 can observe a virtual image of the image light ML in a state in which it overlaps the outside image.

Figure 7:
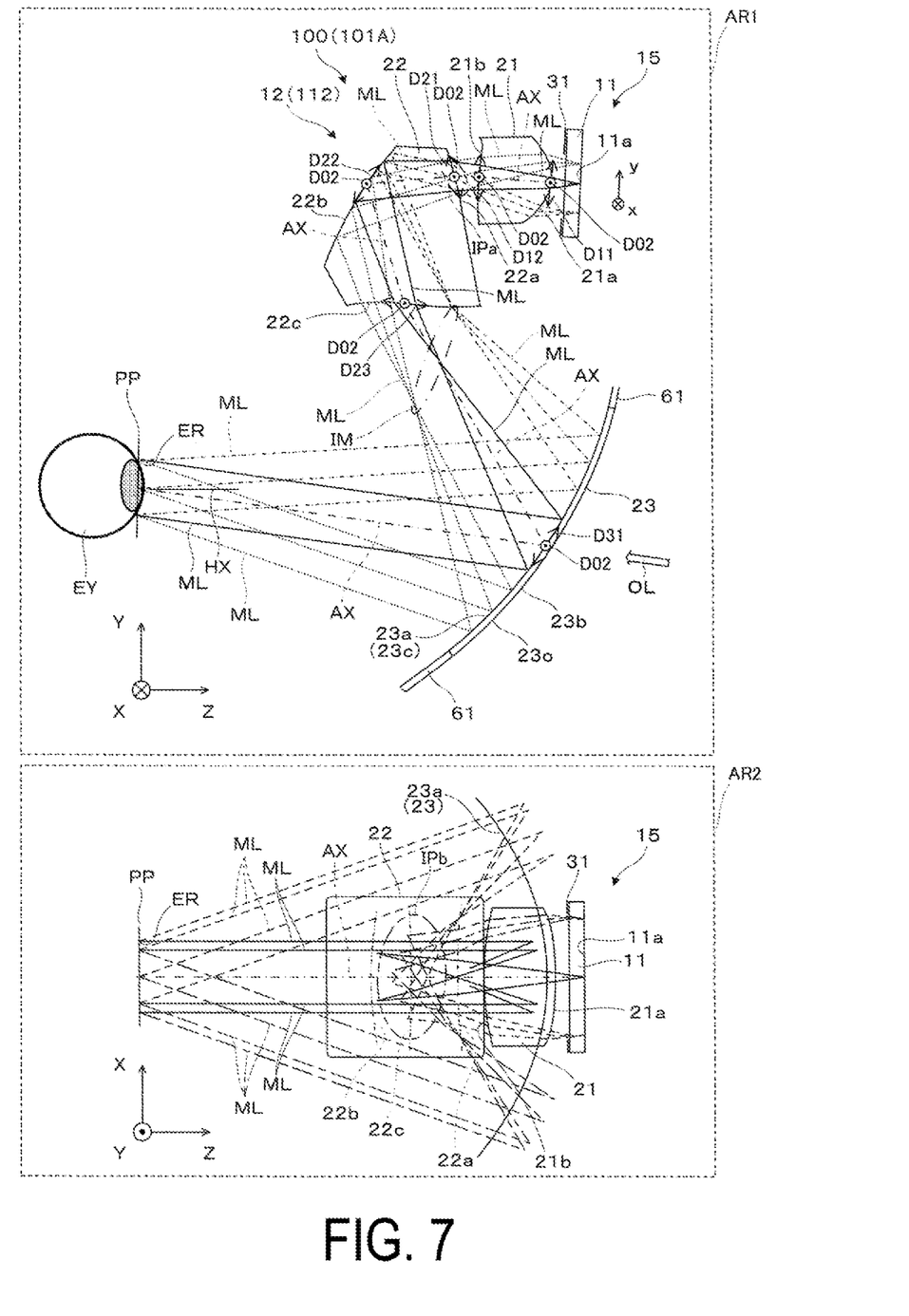
FIG. 7 shows a side cross-sectional view and a plan structural view of an optical system constituting the display device.

In this imaging optical system 12, an intermediate pupil IPa in the longitudinal direction is disposed in the vicinity of the light incident surface 22a of the prism mirror (refer to the region AR1 in FIG. 7). The intermediate pupil IPa in the longitudinal direction means a place at which the image light ML from each of points on a longitudinal line segment extending in the vertical ±y direction from the center of the display surface 11a of the display element 11 spreads longitudinally, and an amount of mutual overlapping thereof is large. An intermediate pupil IPb in the transverse direction is disposed inside the prism mirror 22 (refer to region AR2 in FIG. 7). The intermediate pupil IPb in the transverse direction means a place at which the image light ML from each of points on a transverse line segment extending in the transverse ±x direction from the center of the display surface 11a of the display element 11 spreads transversely, and an amount of mutual overlapping thereof is large. The intermediate pupils IPa and IPb are located at a conjugate point of the eye ring ER or pupil position PP.

An intermediate image IM is formed between the prism mirror 22 and the see-through mirror 23. The intermediate image IM is formed closer to the prism mirror 22 than to the see-through mirror 23. In this way, the burden of enlargement by the see-through mirror 23 can be reduced, and thus the aberration of the observed virtual image can be curbed by forming the intermediate image IM closer to the prism mirror 22 than to the see-through mirror 23. The intermediate image IM is a real image formed at a conjugate position with respect to the display surface 11a, which is located upstream from the eye ring ER in the optical path, and has a pattern corresponding to a display image on the display surface 11a, but it does not need to be a sharply imaged one, and may be one which exhibits various aberrations such as curvature of an image surface and distortion.

Figure 8:
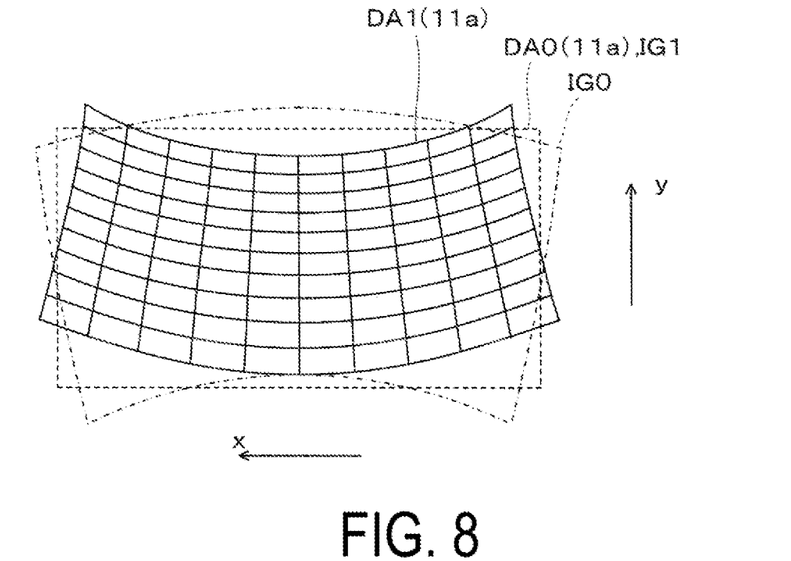
FIG. 8 is a diagram showing distortion correction of a display image.

As shown in FIG. 8, an original projected image IG0 indicating an imaging state by the imaging optical system 12 has relatively large distortion. Because the imaging optical system 12 is the off-axis optical system 112, it is not easy to remove distortion such as trapezoidal distortion. Thus, even in a case in which the distortion remains in the imaging optical system 12, when the original display image is DA0, the display image formed on the display surface 11a is set to a modified image DA1 having trapezoidal distortion in advance. The modified image DA1 is displayed in the used region R01 or the first region R11 of the display unit 111 shown in FIG. 6, and is a distortion-corrected image. In the unused region R02 or the second region R12 outside of the used region R01, the display of an image becomes a black display and is not displayed. In this way, a pixel array of the projected image IG1 of the virtual image observed at the pupil position PP via the imaging optical system 12 can be made into a grid pattern corresponding to the original display image DA0, and the outline thereof can be made rectangular by causing the image displayed on the display element 11 to have reverse distortion that cancels out the distortion formed by the projection lens 21, the prism mirror 22, and the see-through mirror 23. As a result, aberrations can be curbed as a whole including the display element 11 while the distortion aberration generated by the see-through mirror 23 and the like is allowed. Thus, the degree of freedom in the arrangement and size of optical elements such as the prism mirror 22 is increased, and it is possible to easily secure the optical performance of the display device 100 while miniaturization of the display device 100 is achieved.

In the display surface 11a of the display unit 111, the method in which the unused region R02 is not displayed is not limited to black display, and, for example, the entire region may be set to be displayable upon adjustment after assembly, and at a final stage after the adjustment, in a drive circuit associated with the display element 11, the region other than the display region in which the display can be controlled, that is, the unused region R02 may be set not to receive the drive signal from the control device 13.

The display device 100 or optical module 15 of the first exemplary embodiment described above includes: a display element 11 that emits image light ML; an imaging optical system 12 as a light guide optical device that has non-axial symmetry in a predetermined direction and forms an exit pupil by light guiding of the image light ML from the display element 11; and a light-shielding member 31 disposed between the display element 11 and the imaging optical system 12, wherein the light-shielding member 31 has a light-shielding part 31s disposed to overlap a unused region R02 in which an image is not displayed in a display region A0 of the display element 11. In this way, because the light-shielding member 31 has the light-shielding part 31s that is disposed to overlap the unused region R02 which does not display an image in the display region A0 of the display element 11, it is possible to prevent the light incident on the unused region R02 from being reflected by the element surface 11s and becoming ghost light and to prevent generation of unintended leakage light emitted from the unused region R02, and thus it is possible to improve the display quality.

Second Embodiment

Hereinafter, a display device and the like according to a second embodiment of the present disclosure will be described. The display device of the second embodiment is obtained by modifying a part of the display device of the first embodiment, and description of common parts will be omitted.

Figure 9:
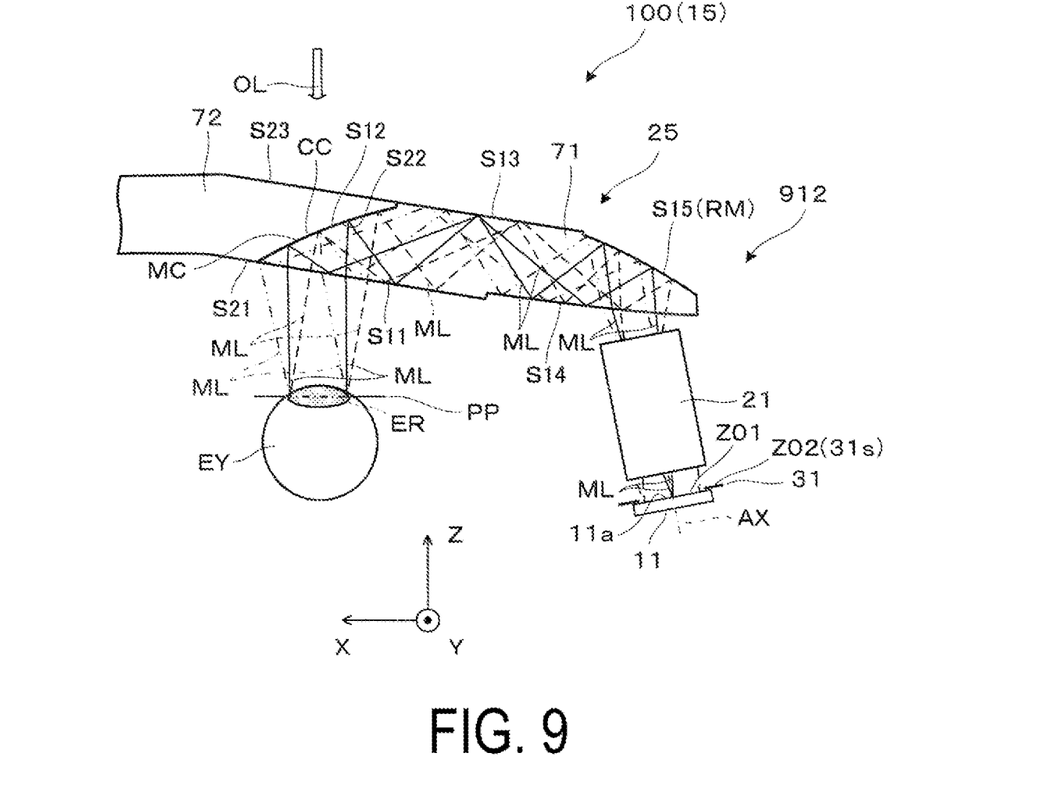
FIG. 9 is a plan view showing a display device according to a second embodiment.

The display device 100 of the second embodiment will be described with reference to FIG. 9. The display device 100 or the optical module 15 includes a display element 11 and an imaging optical system 912. The optical module 15 or the imaging optical system 912 is an off-axis optical system, but is a light path that is reflected and extends in the transverse direction, unlike the first embodiment. The imaging optical system 912 is a light guide optical device, and includes a projection lens 21 and a light guide body 25. The light guide body 25 is formed by joining a light guide member 71 and a light transmission member 72 via an adhesive layer CC. The light guide member 71 and the light transmission member 72 are formed of a resin material that exhibits high light transmittance in a visible region. The light guide member 71 has first to fifth surfaces S11 to S15 of which the first and third surfaces S11 and S13 are flat surfaces parallel to each other and the second, fourth, and fifth surfaces S12, S13, and S15 are convex optical surfaces as a whole and are constituted of freely curved surfaces, for example. The light transmission member 72 has first to third transmission surfaces S21 to S23 of which the first and third transmission surfaces S21 and S23 are flat surfaces parallel to each other, and the second transmission surface S22 is a concave optical surface as a whole and is constituted of a freely curved surface, for example. The second surface S12 of the light guide member 71 and the second transmission surface S22 of the light transmission member 72 have an equal shape in which a recess and a protrusion are inverted, and a partial reflection surface MC is formed at a surface of one of them.

An overview of the optical path of the image light ML will be described below. The light guide member 71 guides the image light ML emitted from the projection lens 21 toward the eye of an observer due to reflection at the first to fifth surfaces S11 to S15 or the like. Specifically, the image light ML from the projection lens 21 is first incident on the fourth surface S14, is reflected by the fifth surface S15 which is an inner surface of the reflection film RM, is incident again on the fourth surface S14 from the inside and totally reflected, is incident on the third surface S13 and totally reflected, and is incident on the first surface S11 and totally reflected. The image light ML totally reflected by the first surface S11 is incident on the second surface S12, and is partially reflected while partially transmitted through a partial reflection surface MC provided on the second surface S12, and is incident again on the first surface S11 and passes therethrough. The image light ML that has passed through the first surface S11 is incident as a substantially parallel luminous flux at a pupil position PP at which the eyes EY of the observer is disposed. That is, the observer will observe an image with the image light ML as a virtual image.

The light guide body 25 is configured to allow the observer to view the image light ML by the light guide member 71, and to allow the observer to observe an external image with little distortion in a state in which the light guide member 71 and the light transmission member 72 are combined. At this time, because the third surface S13 and the first surface S11 are flat surfaces substantially parallel to each other (diopter is approximately 0), little aberration and the like is generated for outside light OL. Furthermore, the third transmission surface S23 and the first transmission surface S21 are flat surfaces substantially parallel to each other. Furthermore, because the third transmission surface S23 and the first surface S11 are flat surfaces substantially parallel to each other, little aberration or the like is generated. As described above, the observer observes an external image without distortion through the light guide member 71 and the light transmission member 72.

In this embodiment as well, the light-shielding member 31 is disposed in the vicinity of the display surface 11a to face the display element 11. The light-shielding member 31 has the light-shielding part 31s outside the opening. Although not shown in the drawings, the light-shielding part 31s corresponds to the light-shielding region Z02 (refer to FIG. 4) of the display device 100 of the first embodiment, and is disposed to overlap the unused region R02 in the display region A0 of the display element 11 in which no image is displayed.

Modified Examples and Others

The present disclosure is described according to the above-described embodiments, but the present disclosure is not limited to the above-described embodiments. The present disclosure may be carried out in various modes without departing from the gist of the present disclosure, and, for example, the following modifications may be carried out.

The light-shielding member 31 does not have to be a completely light-shielding body, and may allow some light to pass therethrough. In this case as well, it is possible to prevent the light incident on the unused region R02 from being reflected and becoming ghost light.

A light control device that controls light by limiting transmitted light of the see-through mirror 23 may be mounted on the outside of the see-through member 23. The light control device adjusts a transmittance, for example, electrically. Mirror liquid crystals, electronic shades, and the like may be used as the light control device. The light control device may adjust a transmittance according to outside light brightness.

In the description above, although it was assumed that the display device 100 was worn on the head and is used, the display device 100 may also be used as a handheld display that is not worn on the head and is to be looked into like binoculars. In other words, the head-mounted display also includes a hand-held display in the present disclosure.

In a specific aspect, an optical module includes: a display element that emits image light, a light guide optical device that has non-axial symmetry in a predetermined direction and forms an exit pupil by light guiding of the image light from the display element, and a light-shielding member disposed between the display element and the light guide optical device, wherein the light-shielding member has a light-shielding part disposed to overlap an unused region in which an image is not displayed in a display region of the display element.

In the optical module described above, because the light-shielding member has the light-shielding part disposed to overlap the unused region in which the image is not displayed in the display region of the display element, it is possible to prevent the light incident on the unused region from being reflected by the element surface and becoming ghost light, and to prevent generation of unintended leakage light emitted from the unused region, and thus it is possible to improve display quality.

In a specific aspect, the display element includes, as a display region, a pixel formation region including a first region corresponding to the used region in which a distortion-corrected image corresponding to distortion of the light guide optical device is displayed, and a second region set in a region other than the first region and corresponding to the unused region, and the light-shielding member includes a transmission region that transmits the image light from at least the first region, and a light-shielding region that overlaps the second region and corresponds to the light-shielding part when seen in a normal direction of the display element. In this case, the display element has the pixel formation region including the first region corresponding to the used region and the second region corresponding to the unused region, and the light-shielding member has the light-shielding region that overlaps the second region and can curb stray light generated by the second region.

In a specific aspect, the transmission region has a contour shape that coincides with a contour shape of the first region. Here, the fact that the contour shapes coincide with each other is not limited to a case in which the contour shapes are exactly congruent, and includes a case in which there is a slight difference. Because the contour shape of the transmission region coincides with the contour shape of the first region, the unnecessary light from the second region can be reliably shielded, and a better image display can be achieved.

In a specific aspect, the transmission region is formed facing a region obtained by extending, along a display surface of the display element, the first region outward by a predetermined number of pixels. In this case, the transmission region is slightly larger than the first region, and fine adjustment in which the first region is shifted by a distance corresponding to a predetermined number of pixels is possible. The predetermined number of pixels serve as an adjustment margin in changing a distortion-corrected shape when the way of the distortion of the optical system changes due to variations in components and assembly.

In a specific aspect, the light-shielding member has an opening in the transmission region and provides light absorption properties in the light-shielding region. In this case, the image light passes through the opening without being blocked by the light-shielding member.

In a specific aspect, the light-shielding member is formed of a plate-shaped member having light transmission properties, and a light absorbing layer is provided in the light-shielding region. In this case, the image light passes through the plate-shaped member without being blocked by the light-shielding member.

In a particular aspect, the second region is formed surrounding a periphery of the first region.

In a specific aspect, the light-shielding member is fixed to a support member that supports the display element. In this case, the light-shielding member can be fixed by the support member while being aligned with the display element.

In a specific aspect, the display device includes the optical module described above, and a control device that performs a distortion-corrected display in the display region of the display element.

In a specific aspect, the control device displays the distortion-corrected image in the first region corresponding to the used region in which an image is displayed in the pixel formation region of the display element, and does not display the image in the second region corresponding to the unused region other than the first region.

What is claimed is:
1. An optical module comprising:
a display element that emits image light;
a light guide optical device that has non-axial symmetry in a predetermined direction and forms an exit pupil by light guiding of the image light from the display element; and
a light-shielding member disposed between the display element and the light guide optical device, wherein the display element includes a first region that emits the image light and a second region that does not emit the image light,
a shape of the first region of the display element corresponds to a distortion caused by the light guide optical device,
the light-shielding member is disposed on a side of the display element that faces the light guide optical device,
the light-shielding member includes a light-shielding part disposed to overlap with the second region of the display element,
the light shielding part has an annular fan-shaped opening corresponding to the first region of the display element,
the annular fan-shaped opening has a tapered surface and expands in a direction away from the display element, and
the annular fan-shaped opening has a shape that coincides with the shape of the first region of the display element.

2. The optical module according to claim 1, wherein the annular fan-shaped opening of the light-shielding member transmits the image light from at least the first region of the display element and overlaps with at least the first region of the display element when seen in a normal direction of the display element, and the light-shielding part of the light-shielding member overlaps with the second region of the display element when seen in the normal direction of the display element.

3. The optical module according to claim 2, wherein:
the transmission region overlaps with the first region of the element display and a part of the second region of the display element, and the part of the second region is a region which extends outward from the first region by a predetermined number of pixels.

4. The optical module according to claim 2, wherein:
the second region of the display element is formed surrounding a periphery of the first region of the display element.

5. The optical module according to claim 1, wherein:
the light-shielding part of the light-shielding member has light absorption properties.

6. The optical module according to claim 1, wherein:
the light-shielding member is fixed to a support member that supports the display element.

7. A display device comprising:
the optical module according to claim 1; and
a control device that controls the first region of the display element to emit the image light.

* * * * *